UNITED STATES PATENT OFFICE.

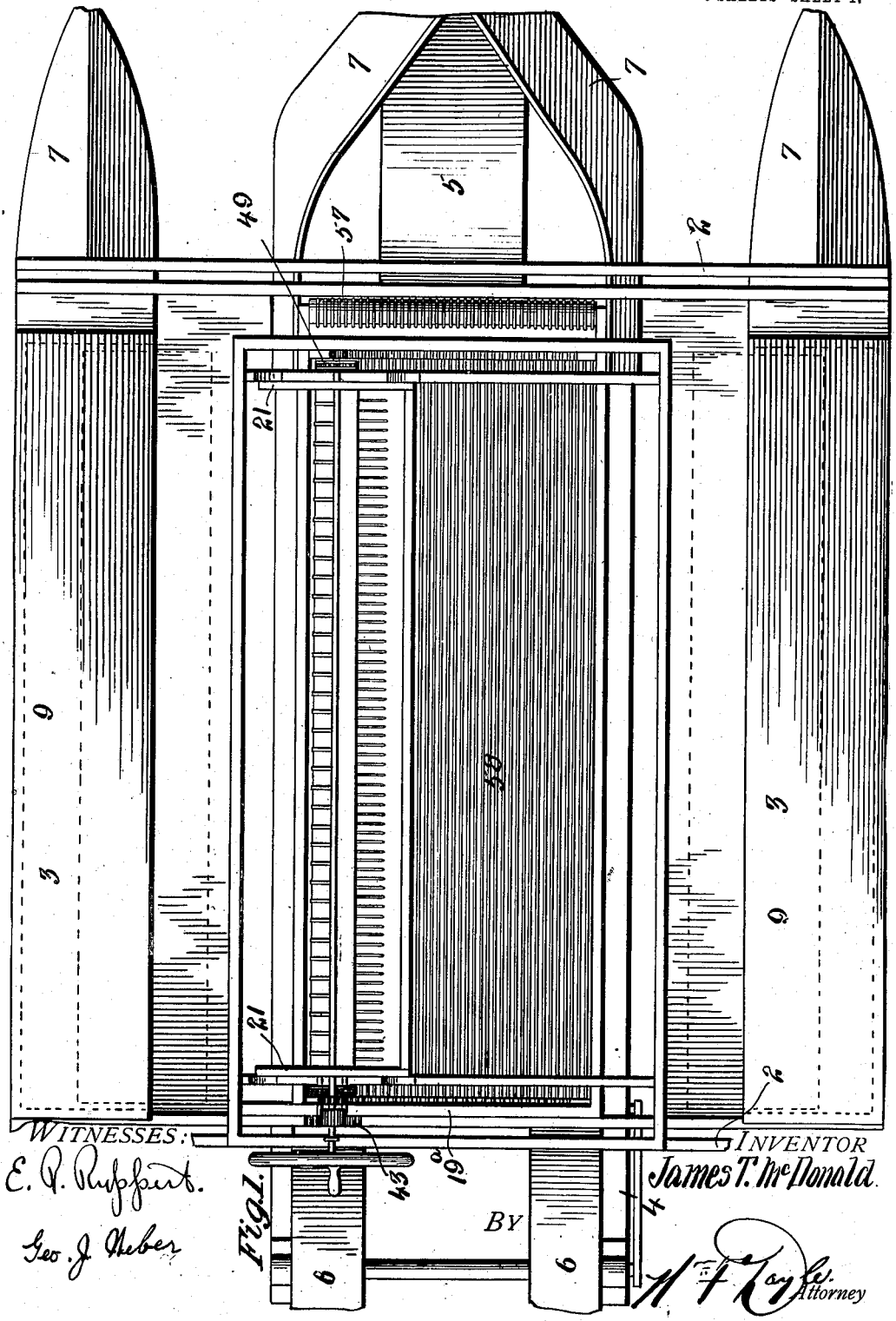

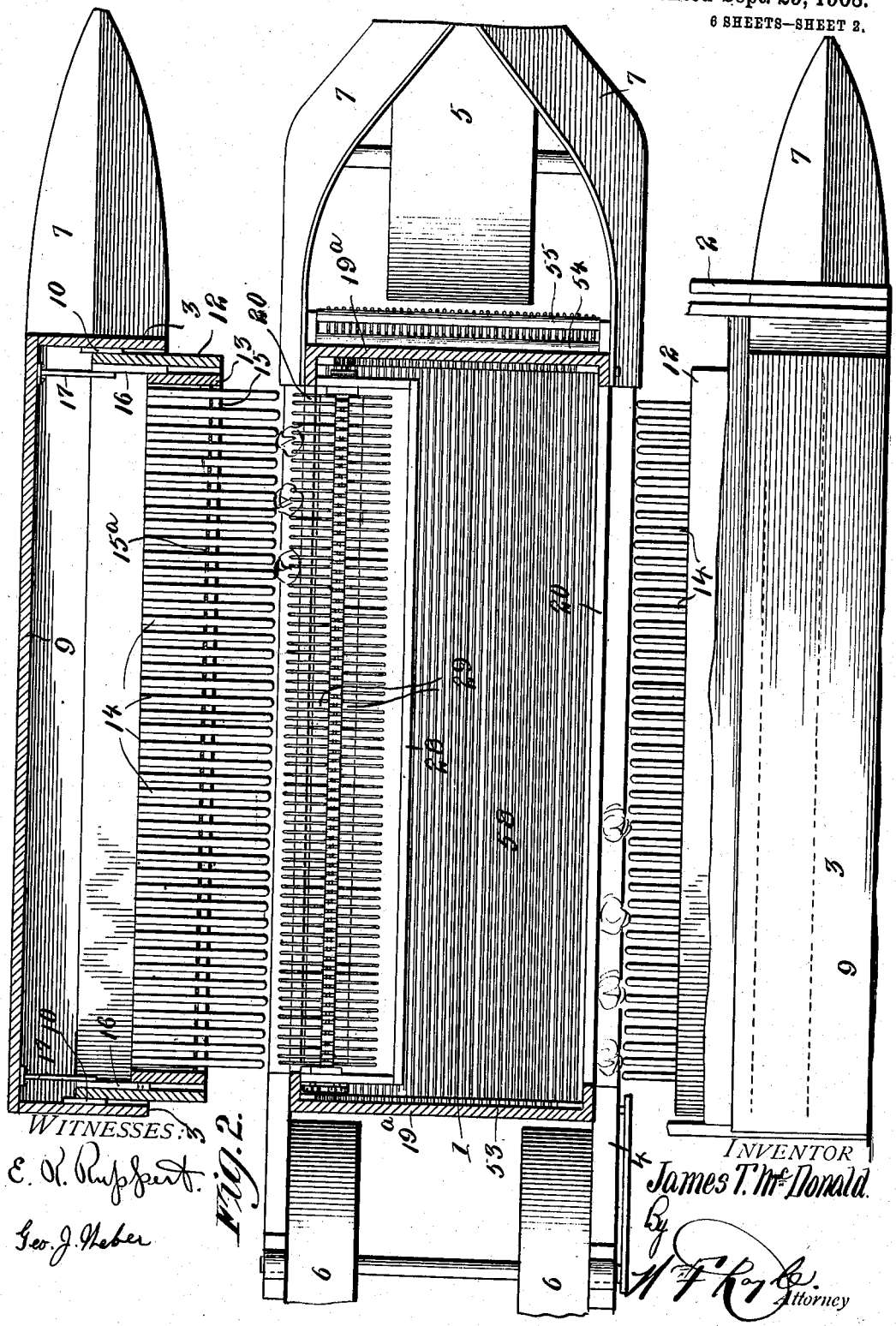

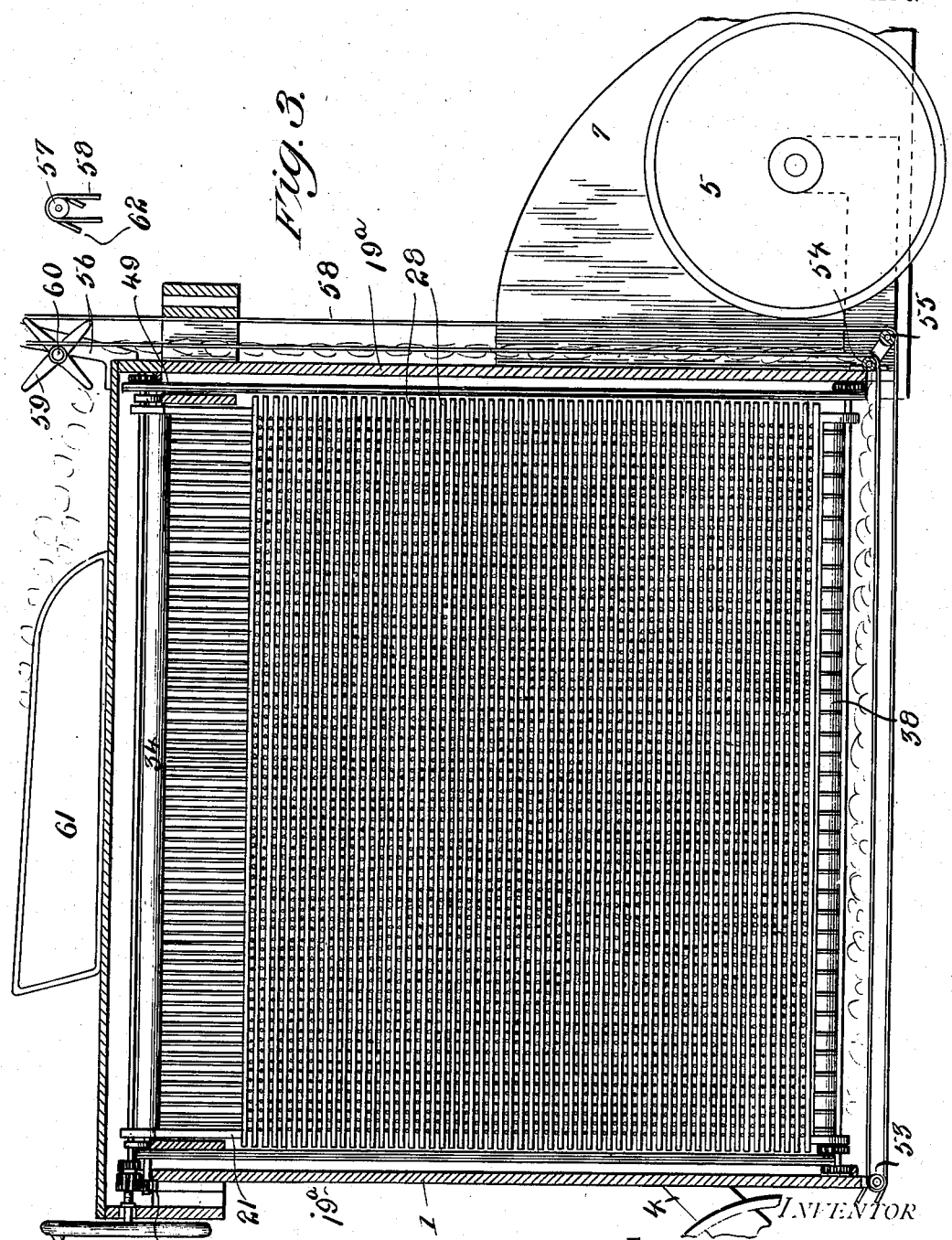

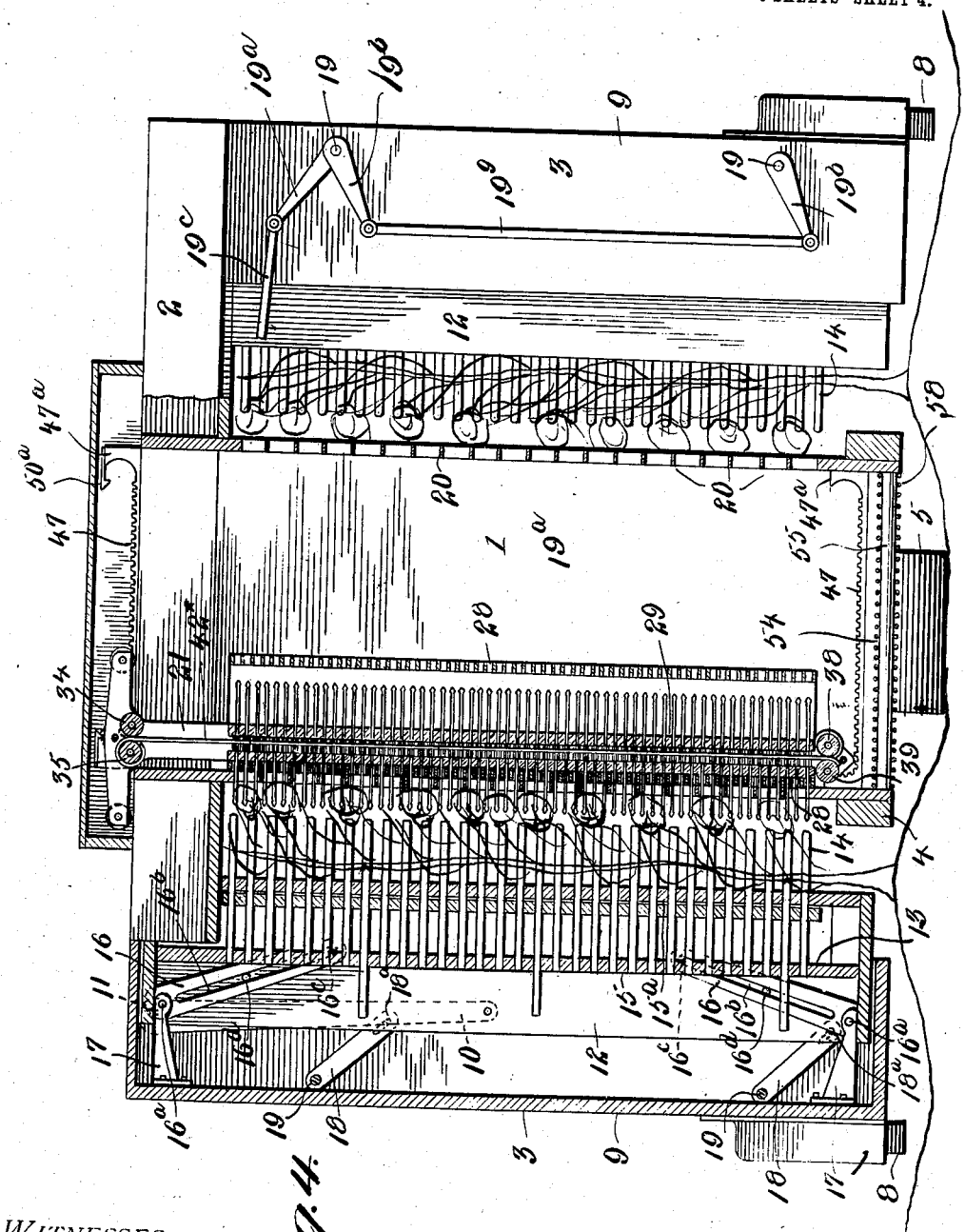

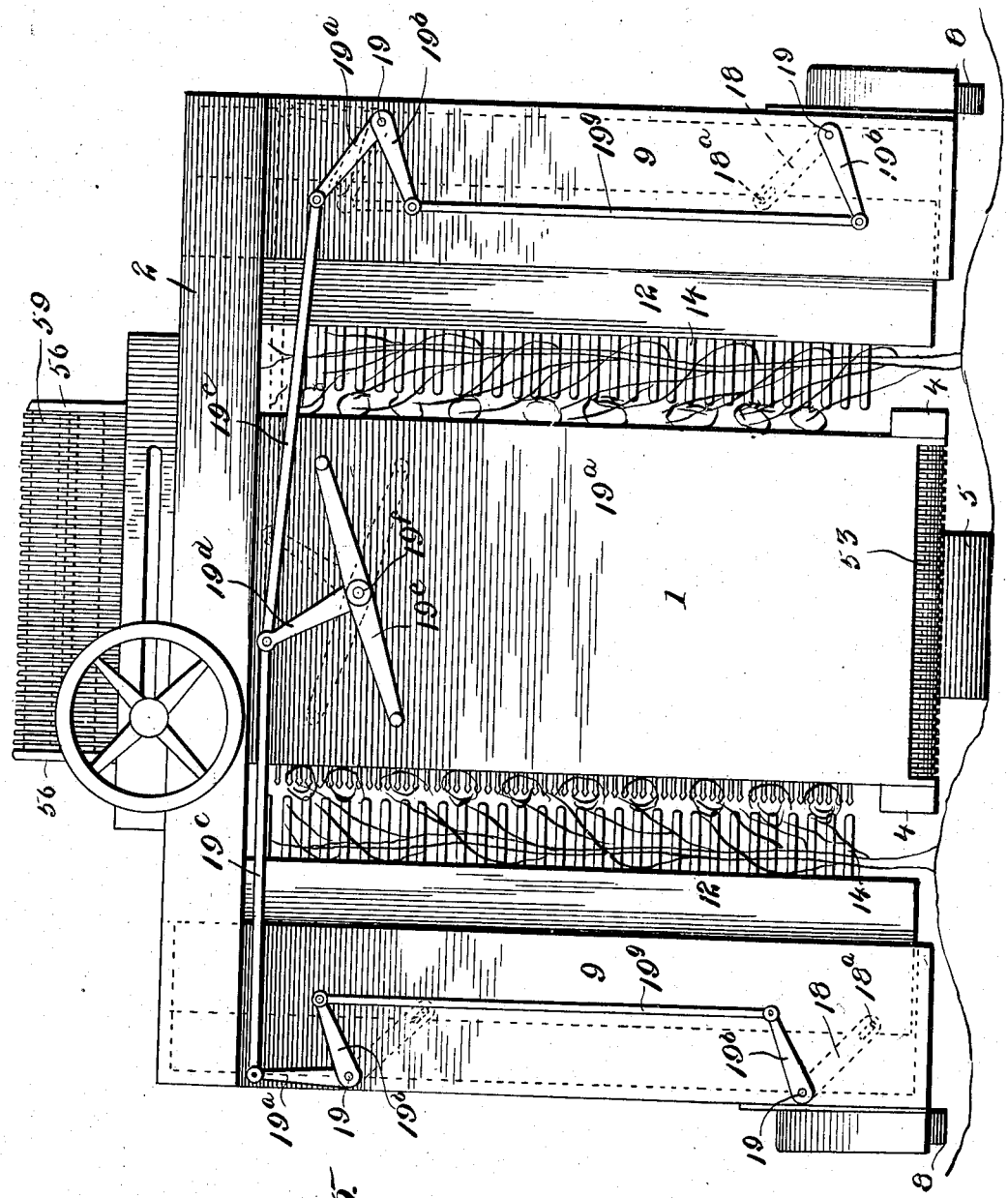

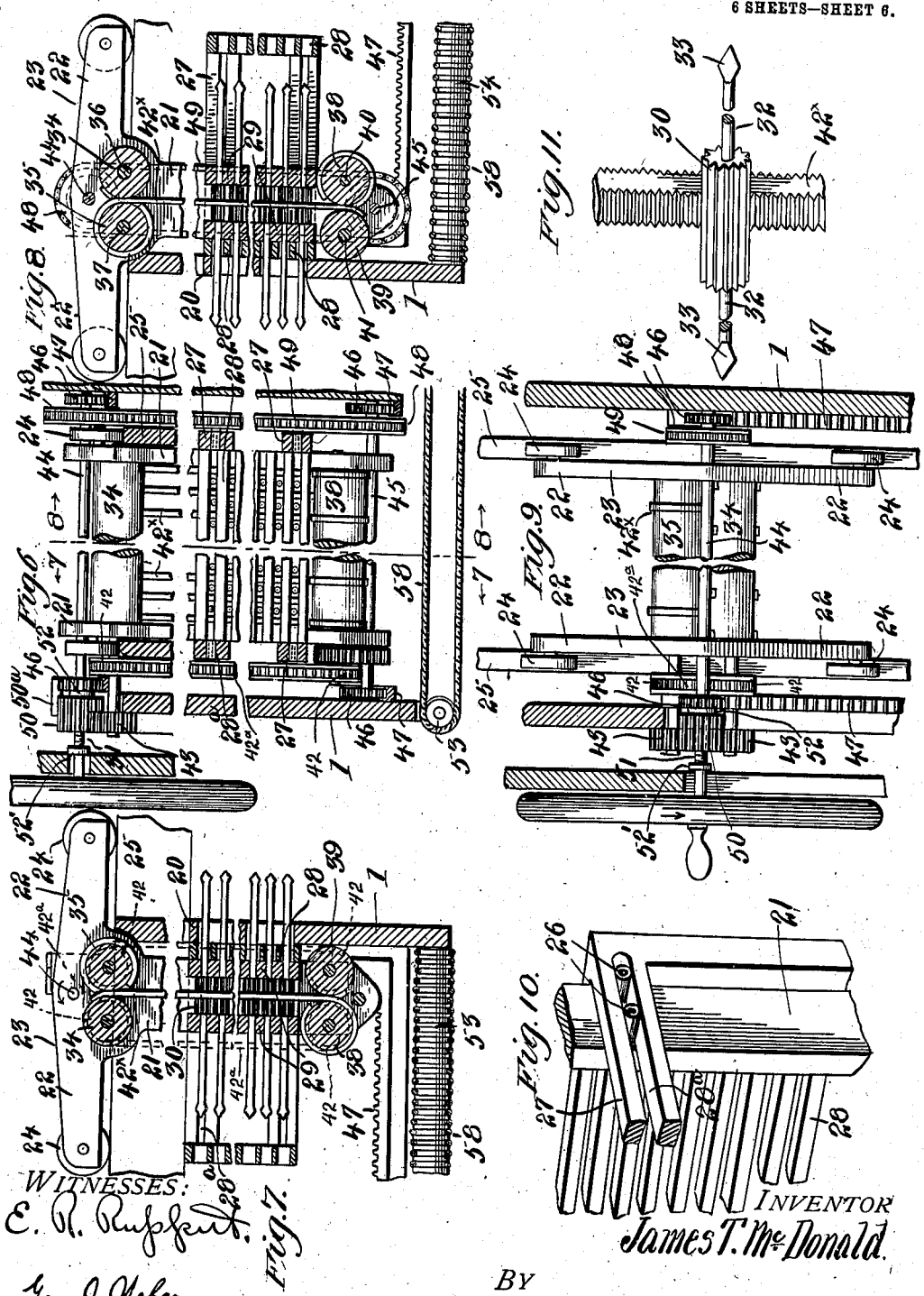

JAMES T. McDONALD, OF LITTLE ROCK, ARKANSAS.

COTTON-PICKER.

No. 899,835.  Specification of Letters Patent.  Patented Sept. 29, 1908.

Application filed May 15, 1907. Serial No. 373,739.

*To all whom it may concern:*

Be it known that I, JAMES T. MCDONALD, a citizen of the United States, residing at Little Rock, in the county of Pulaski and State of Arkansas, have invented certain new and useful Improvements in Cotton-Pickers, of which the following is a specification.

My invention relates to cotton pickers and more particularly to a machine for thoroughly collecting the cotton fiber from the near sides of two adjoining rows of cotton plants in the field.

The object of the invention is to provide means for collecting or gathering the outstanding wild branches of two rows of cotton plants the length of the machine into a vertical position, while advancing the machine one length.

A further object of the invention is to provide means for pressing the plants on both sides, toward a central picking chamber, and at the same time pressing the bolls in advance of the plants, with the fiber thereof, against or in close proximity to the picking chamber.

A further object of my invention is to provide means for advancing the picking needles into the bolls, and then giving said needles axial revolutions to cause same to engage the fiber of said bolls, this to be done alternately, first on one side and then the other of the picking chamber.

A further object of my invention is to provide means for causing a reverse axial revolution of the picking needles after they are withdrawn into the picking chamber, to allow the cotton fiber to be readily brushed or doffed off of said needles.

A further object of my invention is to present the cotton fiber in such a uniform relation to the picking chamber that said fiber will be engaged by the ends of the needles only, from which, it may be readily removed.

My past experience has proved that where a long spindle is inserted into a plant collecting the cotton fiber at any point at which it contacts therewith, in attempting to strip the cotton from the spindle, that which was collected back from the end of the spindle rolls up and becomes so tight thereon that it is impossible to remove it.

In order that my invention may be more thoroughly understood I have clearly illustrated one form thereof in the accompanying drawings and a full and exact description thereof is contained in the annexed specification.

In the accompanying drawings Figure 1 is a top plan view of my improved machine partly in section, Fig. 2 is a horizontal section therethrough, Fig. 3 is a vertical longitudinal section therethrough, Fig. 4 is a vertical transverse section, Fig. 5 is a rear elevation, Fig. 6 is an enlarged vertical longitudinal section of the picker chamber mechanism, parts being broken away, Fig. 7 is a section on line 7—7 Fig. 6, looking in the direction of the arrow, Fig. 8 is a similar view on line 8—8 Fig. 6, Fig. 9 is a top plan of parts shown in Fig. 6, Fig. 10 is a detail perspective showing parts of the stripping frame and the manner of mounting same on the needle carrying frame, and, Fig. 11 is a detail perspective showing one of my double picking needles, and a portion of one of the needle twisting belts.

Referring to the drawings by numerals 1 designates the picker chamber, 2 a lateral extending frame at the top thereof and 3, 3 the presser chambers. The picker chamber, 1, is located between two adjoining rows of cotton plants, and the presser chambers 3, 3, are located outside of said rows.

4 indicates a frame secured to and extending in front and in rear of the lower portion of the picker chamber, a single wheel 5 in front and wheels 6, in rear, are mounted in said frame and support the machine. Carried on the frame 4, in advance of the wheel 5, and on the front of the presser chambers, are the gathering or collecting plows 7, designed to bring all of the outstanding branches of the plants, to an upright position between the sides of the picker chamber and the presser chamber while advancing the machine. Caster wheels 8, 8 are mounted with shields on the outer lower sides of the presser chambers, to prevent the machine from striking the ground in case it tilts to either side.

A description of one of the presser chambers is deemed sufficient as they are identical and operate simultaneously. The presser chamber 3, comprises an outer casing 9, and mounted to swing on links 10, pivoted at 11, to the outer casing, is an inner swinging frame 12. Within said frame 12, is a presser finger frame 13, carrying a series of presser fingers 14. Strips 15, arranged horizontally and covered with rubber or a like substance cause a firm frictional contact between said strips and the presser fingers, and also form bearings therefor. Should one of the presser fingers strike or come in contact with a heavy stem of the cotton plant, this construction will permit the presser finger to stop and the frame to proceed without it, thus preventing the breaking of the finger or the plant. For spacing the presser fingers horizontally I provide vertical strips 15$^a$, secured to the inner face of the strips 15.

Arms 16, having slots 16$^b$, therein are pivoted at 16$^a$, to the brackets 17 mounted on the outer presser chamber. In the outer end of the slot 16$^b$, are pivot pins 16$^c$, adjustably secured to the presser finger frame, and near the center of said slots 16$^b$, are pivot pins 16$^d$, adjustably secured to the inner frame 12. The links 16, cause a relative amount of movement of the presser finger frame, in relation to the swinging frame 12, governed by the adjustment of the pivot pins 16$^c$ and 16$^d$. Links 18, mounted on shafts 19, and secured to the swinging frame 12, at 18$^a$, are designed to project and retract the swinging frame 12, and the pivots 16$^d$, will operate the link which in turn will operate the presser finger frame toward and from the picker chamber. Should several of the presser fingers in their advance movement be stopped as shown in Fig. 4 by coming in contact with heavy branches of the cotton plants, upon the retraction of the finger carrying frame the rear ends of said fingers will come in contact with the rear wall of the presser chamber and be forced back into their normal position in relation to the other fingers.

The picker chamber consists of end walls 19$^a$, connected by side slats 20, spaced as shown to permit the ends of three horizontal sets of picking needles pass out between the same, said slats 20, acting as a partial wall against which the cotton bolls are pressed by the presser fingers, and also to act as means for retarding the branches when the pull comes on the bolls while the fiber is being removed therefrom. Mounted within the picker chamber and adapted to reciprocate from side to side thereof is a needle carrying frame comprising end pieces 21 of substantially T shape. Mounted in the extremities 22, of the T shape head 23, are antifriction rolls 24, adapted to travel on runways 25 at the top of said picking chamber. Mounted on the outer surfaces of the depending portions of the T shape portion 21, at the top and bottom thereof, are pins 26 having antifrictional sleeves. The end pieces 27, of the stripper frame have slots 28$^a$, in which the pins 26 operate, said end pieces 27, of the stripper being connected by horizontal slats 28, intended to pass freely between each horizontal series of picker fingers. By referring to Fig. 2 of the drawings it will be seen that the width of the stripper frame is such as to cause said stripping frame to contact with the side of the picker chamber and stop prior to the completion of the movement of the needle frame, thereby causing the picker needles on the other side of the stripper to be drawn within or between the slats 28, of the stripper and be relieved of cotton picked thereby.

The needle carrying frame consists of the end pieces 21, and two sets of slats 29, connecting the end pieces placed a short distance apart to accommodate the enlarged tooth portions 30 of the picker needles, said picker needles having extended shank portions 32, which are flattened on their ends to form substantially spear shape points 33. The shank portions 32, of the picker needles rest on the slats 29, which form bearing for same. The tooth portions 30 of the picker needles are in line vertically and are of sufficient distance apart to permit of toothed belts or the like or soft ropes to pass vertically between each of said vertical rows of needles.

Rollers 34 and 35 mounted on spindles 36 and 37 at the top, and rollers 38 and 39 mounted on spindles 40 and 41 at the bottom of the end pieces 21 over which alternate belts 42 are adapted to operate, are journaled in the end pieces 21.

By referring to Fig. 7 of the drawings it will be seen that a belt 42$^x$ lying on one side of a vertical series of needles is secured to roll 34 at the top and given a wind about roll 38, at the bottom and secured thereto, a belt lying on the other side of this series of needles is given a wind about roll 35 at the top and is secured to roll 39, at the bottom. This is repeated from end to end of the needle carrying frame. It will readily be seen that by gearing the rollers to revolve in the same direction for say, one revolution the needles will be given axial revolutions, the belts on one side of each vertical series of spindles traveling in one direction while those on the other side travel in the opposite direction, and upon a reverse movement of the rolls a reverse rotation will be imparted to the spindles. The spindles 36, 37 and 40, 41, are extended beyond the T shape frame 21, at the rear and have mounted thereon four sprocket wheels 42, over which an endless sprocket chain 42$^a$, operates, causing all of said spindles to revolve in the same direction when motion is imparted to the upper spindles 36, 37 by gears 43, 43, mounted on said spindles. A shaft 44 above the spindles 36, 37 and lying parallel thereto, and a corresponding shaft 45, beneath the spindles 40, 41, extend beyond said T shape pieces 21 in front and rear and carrying rack wheels 46 meshing in racks 47, secured to the frame of the picker chamber. Mounted on said shafts 44 and 45 are sprocket wheels 48, over which an endless sprocket chain 49 travels to cause a positive movement of the top and bottom of the needle frame, from side to side of the picker chamber.

In operating the machine it is desired to have a slight revolution of the picker needles at the latter part of their longitudinal movement, for two reasons, first to facilitate the needles advancing between any branches of the cotton plants should they contact therewith on their forward movement, second the doffing off of the cotton inside of the picking chamber by the stripping frame is desirable at the last part of the longitudinal movement, therefore the reverse revolutions of the needles for releasing the cotton must be made before that time. I, therefore, desire to impart an intermittent lateral movement to the needle carrying frame and an intermittent revoluble movement to the needles and to have this to a certain extent adjustable. Mounted on shaft 44, in line with and adapted to mesh with the gear wheels 43, 43, on the spindles 36, 37, is a wide face gear 50 internally screw threaded to the shaft 44, the threads 51 on said shaft extending beyond the gear and having adjustably mounted thereon stop nut 52, 52'. It will be seen by referring to Fig. 4 of the drawings that the racks 47 have their ends turned up as shown at 47$^a$, the same being smooth and forming a stop as well as a smooth bearing for the rack wheels 46 at both ends of their travel.

By this construction, referring to Figs. 6 and 7, supposing the needles to the left in Fig. 7 to have taken hold of the cotton in the boll, by giving the shaft 44 a movement in the direction of the arrow, the needle carrying frame will immediately start to the right, the shaft 44 merely turning within the wide face gear 50. Dogs 50$^a$, mounted on the upturned stops 47$^a$, under which the gears 50 advance drop into the teeth of said gears 50 and momentarily hold same at the beginning of the reverse movement of the hand wheel. The gear 50 advancing longitudinally along the shaft toward the other stop 52 but not turning with the shaft. When the gear reaches the stop nut 52 it begins to revolve with the shaft and imparts movement through the gears 43 to the rolls and belts and to the needles. This movement of the needles occurs after they are withdrawn into the picking chamber and before the stripper frame comes in contact with the other side of the picker chamber which causes the opposite side of the stripper frame to doff the cotton from the opposite needles.

Mounted at the base of the picker chamber at its rear end is a grooved roller 53, at the forward end are two rollers 54 and 55, and on brackets 56, on the upper forward end of the picker chamber is a roller 57 over which an endless belt made up of a series of ropes 58, operates to elevate the cotton fiber which is dropped thereon in the picker chamber. The roller 53 is belted to the rear axle to give said endless belt the proper movement while advancing the machine. The cotton fiber resting on the endless belt is carried beneath roller 54 and is there forced partly between said ropes, thereby forming an engagement therewith, and is lifted to a series of star wheels 59 mounted on a shaft 60 which is mounted in the brackets 56 at the top of the picker chamber. The arms of the star wheels 59 lie between the ropes of the belt 58 during part of their revolution, said arms will throw the cotton fiber from said belt into a receptacle 61 resting on top of the machine, the shaft carrying the star wheels 59 is given its motion while the machine is being advanced through the medium of a belt 62 from roller 57.

By referring to the rear elevation, Fig. 5 of the drawings it will be seen that the shafts 19 project outside of the rear walls of the presser chambers and have mounted thereon arms 19$^a$ and 19$^b$. Arms 19$^a$ are connected by links 19$^c$ to arms 19$^d$ rigidly secured to the rocking lever 19$^e$ pivoted at 19$^f$ on the rear face of the picker chamber. The arms 19$^b$ are connected by links 19$^g$. By operating the lever 19$^e$ on its pivot, the presser fingers on both sides of the picker chamber will be forced toward or away from the picker chamber.

The operation is as follows: The machine is advanced the length of its picking surface, with the picker chamber lying between two rows of cotton plants and the presser chambers one on the outside of each of said rows, at which time the plants with all of their branches will be gathered in a compact form between the sides of said picker chamber and said presser chambers. The lever 19$^e$ is thrown to the full line position shown in Fig. 5, at which time the plants will be pressed toward the picker chamber and the pressing fingers will at the same time advance the bolls up against said picker chamber. The hand wheel is then operated which advances the picking needles out into the bolls on one side of the picker chamber, the needles are given a slight axial movement on their way out to insure free passage through the branches of the plants. When the picking needles are fully advanced into the bolls the rack wheels 46 run out of the teeth of the rack 47 and into the blank upturned end portions of same thereby giving the needles no further longitudinal movement, but slightly before this time, however, the wide face gear 50 has traveled along the shaft to the opposite stop nut, and by the gears 43 and rollers carrying the belts 42ˣ, the needles start to revolve and continue to after the carrier stops, thus thoroughly engaging the cotton fiber by said needles. I calculate to place the needles as well as the pressing fingers so close together that at least four of each will be in contact with each boll at one time. Leaving the presser fingers as they are, I reverse the hand wheel which causes the needles to start immediately to recede and at this time the dogs 50ᵃ operate to hold the gear 50 from revolving, thus breaking any jam which it may have on the shaft 44, and still permits it to be drawn from beneath same, and until said gear proceeds longitudinally along shaft 44 to the other stop nut 52, it will be left idle and necessarily the needles as well. Just prior to the arrival of the carriage to its other limit, the gear 50 comes in contact with the stop nut and the needles begin to revolve, after they have revolved about one revolution in an opposite direction, the stripper slats come in contact with the side of the frame and the cotton is pushed or doffed from the needles. If necessary this operation may be repeated before the machine is advanced. When the machine is advanced the cotton just picked and dropped onto the belt 58 will be elevated and discharged into the basket on top of the machine.

Having described my invention, what I claim and desire to secure by Letters Patent is, 1. In a machine for picking cotton from plants, the combination with a picking mechanism, of means movable toward and from said mechanism for engaging the fiber bearing portions of the plants to retain the same in coöperative position for the action of the picking mechanism.

2. In a machine for picking cotton from plants, the combination with picking mechanism, of means reciprocating relative to said mechanism for pressing the fiber bearing portions of the plants toward said picking mechanism substantially as described.

3. In a movable machine for picking cotton from plants, the combination with picking mechanism, of means reciprocating relative to said mechanism for pressing the fiber bearing portions of the plants toward said picking mechanism and means for guiding said portions of the plants between said picking and pressing mechanisms, substantially as described.

4. In a movable machine for picking cotton from plants, the combination with picking mechanism, of devices located on opposite sides of said picking mechanism for pressing the fiber bearing portions of the plants toward the same and means for guiding adjacent rows of plants between said picking mechanism and said pressing devices, substantially as described.

5. In a machine for picking cotton from plants, the combination with a picking chamber of mechanism for pressing portions of the plants toward said chamber and picking mechanism within said chamber for picking the cotton fiber and delivering the same into said chamber, substantially as described.

6. In a machine for picking cotton from plants, the combination with a picking chamber, of mechanism for pressing portions of the plants toward said chamber, picking mechanism within said chamber for picking the fiber from the plants and delivering same into said chamber and mechanism for conveying the fiber in said chamber to a collecting receptacle, substantially as described.

7. In a machine for picking cotton from plants, the combination with a picking chamber having apertures in a surface thereof, of reciprocating picker needles mounted in said chamber in line with said apertures therein and mechanism for simultaneously reciprocating and revolving said needles whereby said needles are alternately forced through and withdrawn from said apertures in said chamber, substantially as described.

8. In a machine for picking cotton from plants, the combination with a picking chamber having apertures in a wall thereof, of reciprocating picker needles mounted in said chamber in line with said apertures therein, mechanism for pressing the fiber bearing portions of the plants toward the apertures in said chamber and mechanism for reciprocating said needles to alternately project said needles through and withdraw the same from said apertures in said chamber, substantially as described.

9. In a machine for picking cotton from plants, the combination with a picking chamber having apertures in a wall thereof, of a stripper within said chamber provided with apertures therein substantially in line with said apertures in said chamber, reciprocable and revoluble needles mounted within said chamber in line with said apertures therein and said apertures in said stripper and mechanism for reciprocating and revolving said needles, said mechanism being adapted to revolve said needles in one direction when projecting the same and in an opposite direction when retracting them, substantially as described.

10. In a machine for picking cotton from plants, the combination with a picking chamber having apertures in a wall thereof, of a stripper within said chamber provided with apertures therein substantially in line with said apertures in said chamber, reciprocable and revoluble picker needles mounted within said chamber in line with said apertures therein and with said apertures in said stripper, and mechanism for reciprocating said needles and simultaneously revolving the same as they reach the extent of their throw, substantially as described.

11. In a machine for picking cotton from plants, the combination with a picking chamber having apertures in a wall thereof, of a stripper within said chamber provided with apertures therein substantially in line with said apertures in said chamber, reciprocable and revoluble picker needles mounted within said chamber in line with said apertures therein and said apertures in said stripper, and mechanism for simultaneously reciprocating and revolving said needles, said mechanism including adjustable means for permitting said needles to move longitudinally to a desired extent before revolving same, substantially as described.

12. In a machine for picking cotton, the combination with a picker chamber having apertures in a wall thereof, of a reciprocable frame mounted within said chamber, picker needles revolubly mounted in said frame in line with said apertures in said chamber, belts mounted on said frame and movable in opposite directions, said belts being adapted to engage said needles on opposite sides to revolve the same, and mechanism for reciprocating said frame and operating said belts, substantially as described.

13. In a machine for picking cotton, the combination with a picker chamber having apertures in a wall thereof, of a reciprocable frame mounted within said chamber, picker needles revolubly mounted on said frame in line with said apertures in said chamber, belts mounted on said frame and movable in opposite directions, said belts being adapted to engage said needles on opposite sides to revolve the same, and mechanism for reciprocating said frame and operating said belts, said mechanism including means for automatically reversing the movement of said belts when the movement of said frame is reversed, substantially as described.

14. In a machine for picking cotton, the combination with a picker chamber having apertures in a wall thereof, of a frame mounted within said chamber and movable toward and from the apertured wall thereof, picker needles revolubly mounted on said frame in line with said apertures in said chamber, each of said needles being provided with longitudinal corrugations, oppositely movable corrugated belts mounted on said frame and adapted to engage the corrugated portions of said needles on opposite sides thereof, mechanism for reciprocating said frame and operating said belts, said mechanism including a pinion for driving said belts, said pinion being tapped and mounted on a screw threaded power shaft, adjustable stop nuts on said power shaft for limiting the movement of said pinion longitudinally of said shaft, whereby said frame may be reciprocated a predetermined distance before the belts are operated, substantially as described.

15. In a machine for picking cotton, the combination with a picker chamber having apertures in the opposite sides thereof, of a movable stripper located within said chamber and having apertures in opposite sides thereof, said apertures in said stripper being substantially in line with said apertures in said chamber, a reciprocable needle frame mounted within said stripper and having series of picker needles mounted thereon and extending in opposite directions and in line with said apertures in said stripper and mechanism for reciprocating said frame and revolving said needles, substantially as described.

16. In a machine for picking cotton, the combination, with a picker chamber having apertures in opposite sides thereof, of a movable stripper located within said chamber and having apertures in opposite sides thereof, said apertures in said stripper being substantially in line with said apertures in said chamber, a reciprocable needle frame mounted within said stripper and having series of picker needles mounted thereon and extending in opposite directions in line with said apertures in said stripper, mechanism for reciprocating said needle frame and revolving said needles, and devices located on opposite sides of said picker chamber for pressing the fiber bearing portions of plants toward the apertures in said chamber substantially as described.

17. In a machine for picking cotton from plants, the combination with a picking mechanism, of mechanism for pressing the fiber bearing portions of the plants toward said picking mechanism, said pressing mechanism including reciprocable pressing fingers movable toward and from said picking mechanism, substantially as described.

18. In a machine for picking cotton from plants, the combination with a picking mechanism, of mechanism for pressing the fiber bearing portions of the plants toward the picking mechanism, said pressing mechanism including reciprocable pressing fingers movable toward and from said picking mechanism, said fingers being mounted independently of one another and each being adapted to yield upon coming in contact with a stationary obstacle without retarding the movement of the remaining fingers, substantially as described.

19. In a machine for picking cotton, the combination with a picking mechanism, of a reciprocating pressing frame movable toward and from said picking mechanism, pressing fingers slidably mounted in said frame and frictional means for retarding the movement of said fingers in said frame, substantially as described.

20. In a machine for picking cotton from plants, the combination with a picking chamber, of a presse rchamber having a swinging presser frame mounted therein, a presser finger frame within said swinging frame, presser fingers mounted in said finger frame and means for moving said presser frame and said finger frame toward and from said picking chamber, substantially as described.

In testimony whereof I affix my signature in presence of two witnesses.

JAMES T. McDONALD.

Witnesses:
F. H. HUBBARD,
E. R. RUPPERT.